Oct. 31, 1950     B. E. HILL     2,528,057
REVERSE CLUTCH MECHANISM
Filed Sept. 4, 1947     3 Sheets-Sheet 1
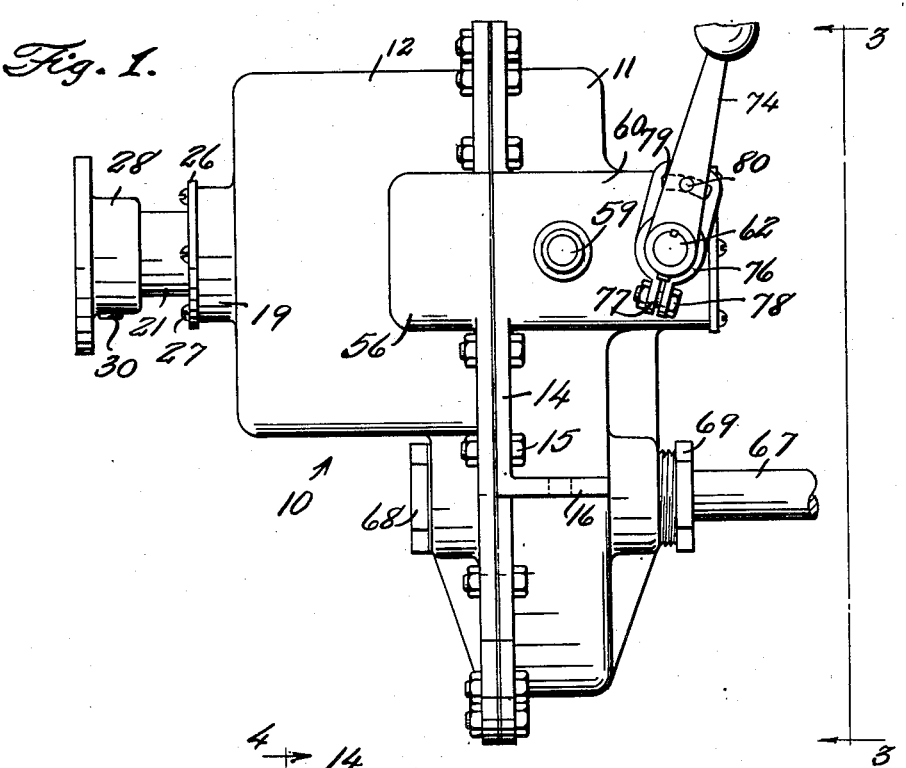
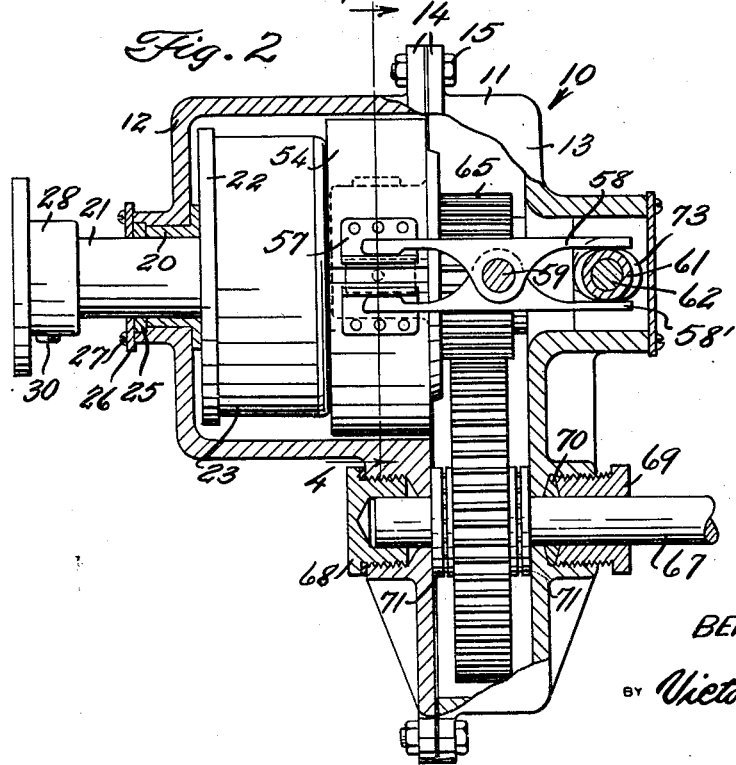
INVENTOR.
BERNARD E. HILL
BY *Victor J. Evans & Co.*
ATTORNEYS

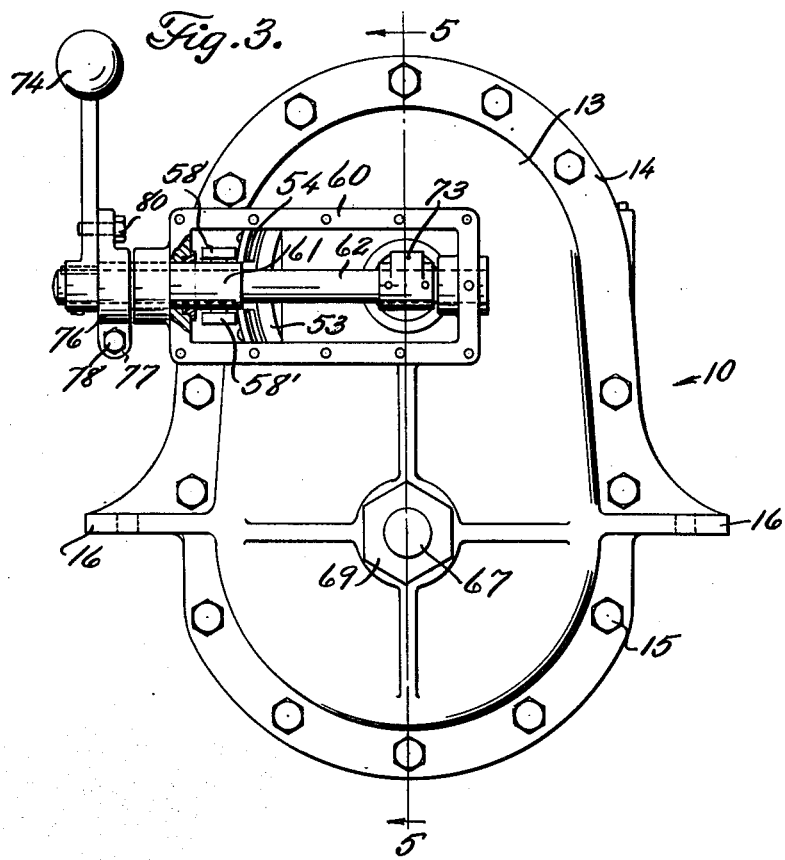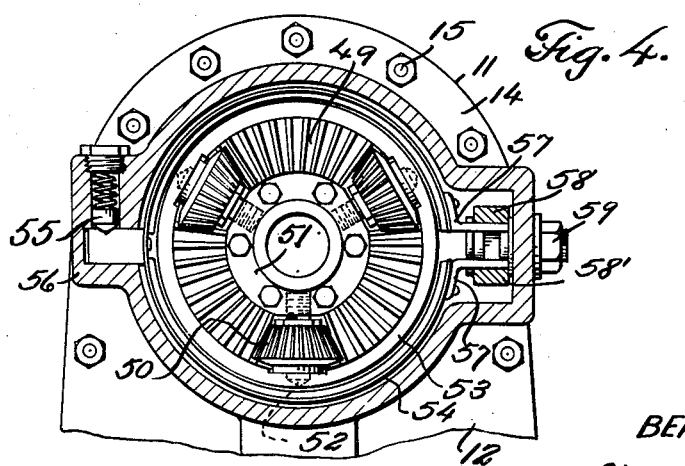

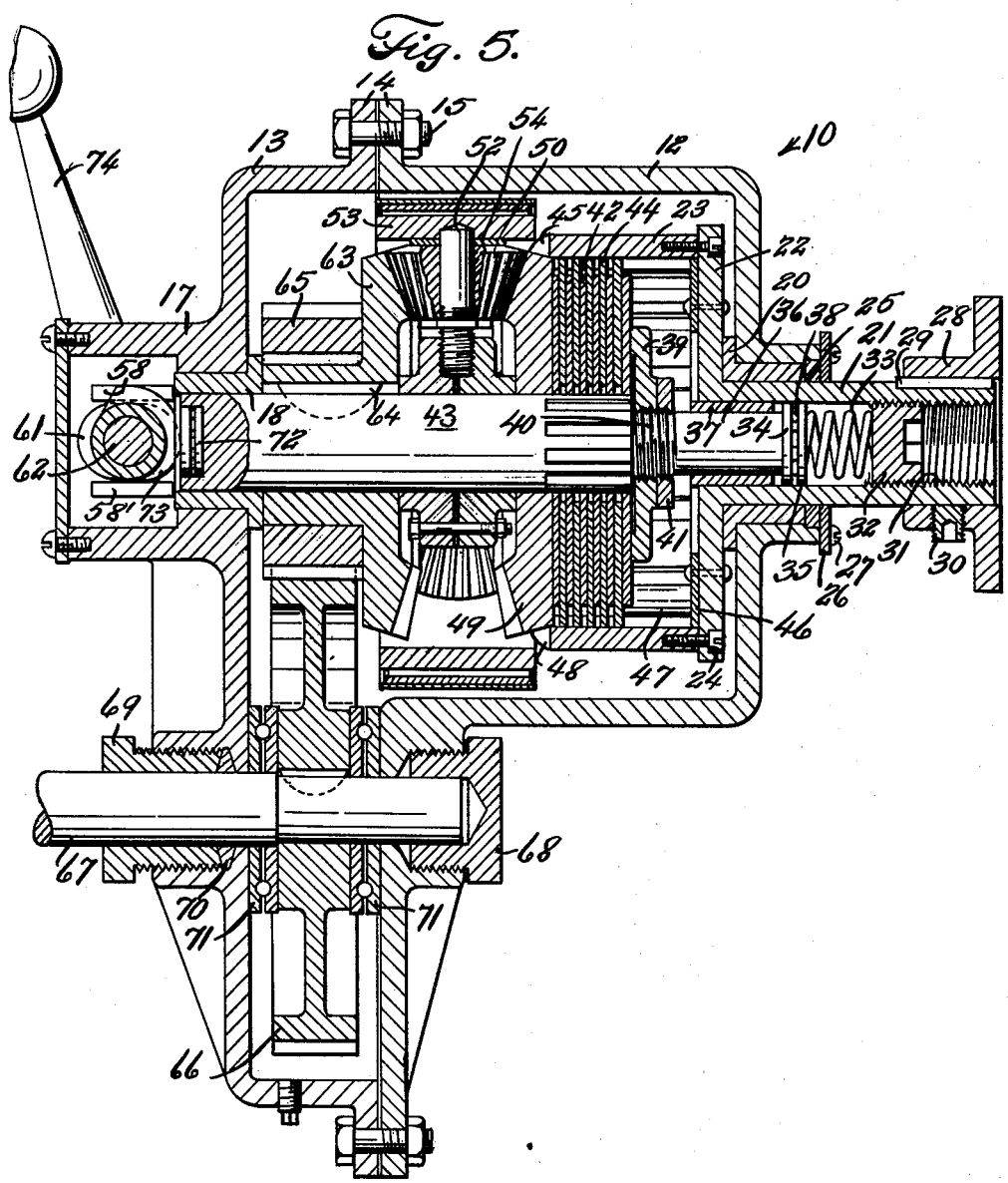

Patented Oct. 31, 1950

2,528,057

UNITED STATES PATENT OFFICE 2,528,057

REVERSE CLUTCH MECHANISM

Bernard E. Hill, Jacksonville, Fla.

Application September 4, 1947, Serial No. 772,071

1 Claim. (Cl. 74—780)

This invention relates to a reverse clutch mechanism and the primary purpose and object of this invention is to provide a compact and rugged mechanism, combining a clutch, reverse gear, reduction gear, offset power take-off and brake assembly for use and application with marine engines, remote control assemblies, ship steering installation and all other applications requiring forward, neutral and reverse positions at any predetermined gear ratio.

Another object of the invention is to provide a mechanism of the type which consists of a multiple disc clutch which is driven directly by a hollow shaft containing the clutch spring and tension adjusting screw and driving a sliding spindle upon which is affixed the compression flange engaging the clutch.

A basic and exclusive advantage of this device is in its use with marine engines where it permits installation of the engine above the propeller shaft or stern tube and aft of cabin and cargo space and permits the use of propeller characteristics exactly suited to the design of the boat coupled to the correct speed of the engine used. By the addition of a Universal joint, the engine may be mounted horizontally. By attaching the mechanism to the engines with power take-off either port or starboard of the crank shaft twin engine installations may be better suited to deck plans.

Applied to air cooled engines in small craft, the device is particularly valuable, since it allows engine speeds in the best range for proper cooling and efficiency with the propeller design best suited to the boat.

The mechanism is designed for quick and easy access to internal parts, is protected against shock and abuse and may be manufactured in any size.

With the above and other objects and advantages in view, the invention consists of the novel details of construction, arrangement and combination of parts more fully hereinafter described, claimed and illustrated in the accompanying drawings in which:

Figure 1 is a side elevational view of an embodiment of the invention;

Figure 2 is a detailed view, partly in section and partly in elevation, of the mechanism;

Figure 3 is an end elevational view looking in the direction of the arrows on the line 3—3 of Figure 1;

Figure 4 is a sectional view on the line 4—4 of Figure 1 and

Figure 5 is an enlarged vertical sectional view of Figure 1.

Referring more in detail to the drawings, the mechanism embodying the invention will be generally designated by the reference numeral 10. The mechanism comprises the sectional casing or housing 11, which includes the front section 12 and rear section 13. Each section is provided with an outwardly right-angular extending assembly flange 14 which flanges are in face to face engagement with each other, to receive the bolts 15, whereby the sections are retained in fixed relation to each other.

The section 13 has the mounting brackets or supports 16 formed integral therewith, whereby the housing is mounted in fixed relation to the motor mechanism with which it is to be assembled.

The section 13 is provided with a bearing seat 17 to receive the bearing 18, while the section 12 is provided with a bearing seat 19 to receive the bearing 20. Journalled in the bearing 20 is the sleeve or housing 21, having the plate 22 formed on the inner end thereof to which the cage 23 is secured by bolts 24. Abutting the bearing 20, and sleeved on the sleeve 21 is an oil seal 25 which is retained in the bearing seat 19 by a ring plate 26 sleeved on the sleeve 21, and secured to the seat 19 by bolts 27. Thus a leakproof seat is provided for the sleeve 21, which, at its outer end, has the drive flange 28 keyed thereon by the key 29. A set screw 30 carried by the flange 28 engages the sleeve 21 to aid in preventing slippage of the flange on the sleeve.

The inner surface of the sleeve, at its outer end, is threaded as at 31 to receive the clutch adjuster nut 32 which, abutting the coil tensing spring 33, abuts the disc 34 which is in opposed relation to the disc 35 formed on the pilot shaft 36 which is journalled in the bushing or bearing 37 in the sleeve 21. The disc 34 and disc 35 form a thrust bearing having the balls 38 arranged between them.

The inner end of the shaft 36 has the clutch engaging plate 39 threadably mounted thereon at 40, and a lock nut 41 engages the threads to prevent the rotation of the plate thereon. This plate engages the outermost disc of the clutch discs 42 splined on the driven shaft 43 in alignment with the pilot shaft 36. The clutch discs 44 are placed intermediate of the discs 42 and are received at their outer peripheries in the ring seat 45 carried by the cage 23. A ring 46 secured to the inner face of the plate 22 engages the splines 47 formed in the seat 45 which splines guide the action of the clutch discs.

Fixed by rivets 48 to the cage 23, is the ring gear 49 which is engaged by the spider gears 50 carried by the spider 51, and the shafts 52 for the gears 50 engage the reverse drum 53. A bronze bushing 54 is mounted on the shaft 52 intermediate the gears 50, and drum 53. A contractable reverse band 54 is positioned about the drum 53 and is mounted by the recentering spring assembly 55 in the housing 56 on the section 12. The opposed ears 57 on the band 54 are engaged by the levers 58 and 58' respectively, which are pivoted on the bolt shaft 59 carried by the housing 60 which is in alinement with and of the same shape as the housing 56. The opposite ends of the levers are engaged by the reverse cam 61 fixed to the control shaft 62.

Also engaging the gears 50 is the ring gear 63 which is keyed to the shaft 43 for a slip fit by the key 64. The gear carries the gear 65 which engages the gear 66 keyed to the shaft 67 journalled in the bearing nuts 68 and 69, which are carried by the sections 12 and 13 respectively. Packing 70, inwardly of the bearing nut 69, provides a seal for the shaft.

Thrust washers 71 are sleeved on the shaft 67 on opposite sides of the gear 66, and this provides a reverse assembly to drive under, if desired.

The outer end of the shaft 43 has a thrust bearing assembly 72 positioned therein which is engaged by the clutch cam actuator 73 on the shaft 62. The shaft 62 is journalled in the housing 60 formed on the bearing seat 17, and on the outer end has the control handle 74 keyed thereon at 75. Also mounted on the shaft 62, inwardly of the handle 74, is the reverse band take-up and adjustment clamp 76. The clamp has opposed ears 77 to receive the bolt 78, whereby the clamp is retained on the shaft. A curved slot 79 in the clamp receives the bolt 80 whereby the clamp is associated with the handle 74 in which the bolt 80 is threaded.

When the control lever is manipulated, the cam 73 causes the driven discs to be engaged by the driving discs in that both discs rotate as a unit. The manipulation of the handle 74 will also actuate the reverse drum as is conventional in the art. The handle in one extreme position giving direct drive, in center position, neutral, and in the opposite extreme position, reverse. When in direct drive as in Figure 5 the cam 73 is at its lowest point of curvature, the spring 33 will force the discs into engagement with each other. When the summit of the cam is reached the discs will be disengaged by the inward movement of the shaft 43 and the device is in neutral. When the lever has been moved to the position directly opposite from the position of Figure 5 the device is in reverse. The movement of the shaft 43 through the engagement of the cam 73 causing the different driving positions.

The conventional planetary reverse gear 63 being operated by the contraction of the band 54 on the drum 53, and the levers which cause the contraction are operated by the cam on the shaft 62. Both cams on the shaft 62 are moved simultaneously but the cams only operate when the handle is in opposed extreme positions.

The gears 65 and 66 drive the shaft 67 which is a power take-off which, as stated, is an assembly to drive under the mechanism or away from the mechanism. The shaft 67 will therefore permit connections to be made below the horizontal plane of the shaft 43 to permit other equipment to be connected there to the drive mechanism at a remote distance from the assembly or to attach equipment to the assembly that would not be in alignment with the drive flange 28 or in the opposite direction from the flange 28.

If a brake band is placed for cooperation with the cage 23, the band could be contracted to hold the cage in fixed position. Thus the mechanism could be used with hoists where load holding is required.

A one to one gear ratio could be obtained by making both gears 65 and 66 of the same size.

There has thus been provided a mechanism having a combination of standard and conventional mechanical elements which are designed to accomplish the purposes set forth, and for which at the present time there is not available a like mechanism.

It is believed that the construction of the mechanism will be apparent to those skilled in the art, and it is to be understood that any minor changes may be made in the construction, provided such changes fall within the spirit of the invention and the scope of the appended claim.

Having thus described the invention, what is claimed as new and desired to be secured by Letters Patent is:

A reverse clutch mechanism of the type described comprising a sectional housing, a drive and driven shaft in the housing in alined relation to each other, a cage fixed on said drive shaft, clutch discs in said cage in fixed relation to said cage and clutch discs in said cage in alternate spaced relation to said first discs in fixed relation to said driven shaft, a bevelled gear secured to said cage, a bevelled gear positioned opposite to said first bevelled gear, both of said gears being positioned on said driven shaft and said second gear having a slip fit with said driven shaft, a spider gear assembly mounted on said driven shaft intermediate of said bevelled gears, means coacting with the driven shaft to shift said shaft longitudinally to compress said clutch discs to cause rotation of said bevelled gears in a forward drive, a reverse assembly including a reverse band and a reverse drum coacting with said spider gear assembly whereby when said driven shaft is moved longitudinally in the opposite direction said reverse band will engage said drum whereby said driven shaft will be rotated in a reverse direction and a clutch adjusting assembly mounted in said drive shaft.

BERNARD E. HILL.

REFERENCES CITED

The following references are of record in the file of this patent:

UNITED STATES PATENTS

| Number | Name | Date |
|---|---|---|
| 750,229 | Sheppard | Jan. 10, 1904 |
| 954,169 | Clarke | Apr. 15, 1910 |
| 1,304,990 | Kruse | May 27, 1919 |
| 1,653,262 | Dickson | Dec. 20, 1927 |
| 1,835,153 | Greve | Dec. 8, 1931 |
| 1,891,182 | Ross | Dec. 13, 1932 |
| 1,932,983 | Morgan | Oct. 31, 1933 |

FOREIGN PATENTS

| Number | Country | Date |
|---|---|---|
| 346,102 | Germany | Dec. 24, 1921 |